US010195870B2

(12) United States Patent
Chang et al.

(10) Patent No.: US 10,195,870 B2
(45) Date of Patent: Feb. 5, 2019

(54) INK JET PRINT METHOD WITH INTEGRATED SPOT COLOR AND PROCESS COLOR

(71) Applicant: Avery Dennison Corporation, Glendale, CA (US)

(72) Inventors: Ying Chang, Buffalo Grove, IL (US); Nikhil R. Agashe, Naperville, IL (US); John D. Peck, Arlington Heights, IL (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/457,478

(22) Filed: Mar. 13, 2017

(65) Prior Publication Data

US 2017/0266981 A1   Sep. 21, 2017

Related U.S. Application Data

(60) Provisional application No. 62/309,673, filed on Mar. 17, 2016.

(51) Int. Cl.
*B41J 2/21* (2006.01)
*H04N 1/60* (2006.01)
*H04N 1/62* (2006.01)
*H04N 1/54* (2006.01)

(52) U.S. Cl.
CPC .............. *B41J 2/21* (2013.01); *B41J 2/2103* (2013.01); *H04N 1/54* (2013.01); *H04N 1/6058* (2013.01); *H04N 1/6075* (2013.01); *H04N 1/628* (2013.01)

(58) Field of Classification Search
CPC .......................................................... B41J 2/21
See application file for complete search history.

(56) References Cited

U.S. PATENT DOCUMENTS

| 5,734,800 | A  | 3/1998  | Herbert et al. |
| 6,066,422 | A  | 5/2000  | Blaszak et al. |
| 6,637,860 | B1 | 10/2003 | Madeley |
| 6,717,699 | B1 | 4/2004  | Janssen et al. |
| 7,004,562 | B2 | 2/2006  | Madeley |
| 7,032,517 | B2 | 4/2006  | Bestmann |
| 7,420,707 | B2 | 9/2008  | Agehama |

(Continued)

FOREIGN PATENT DOCUMENTS

WO   2010/126599   11/2010

OTHER PUBLICATIONS

International Search Report and Written Opinion dated May 31, 2017 issued in corresponding International Application No. PCT/US2017/022133 filed Mar. 13, 2017.

(Continued)

*Primary Examiner* — Shelby L Fidler
(74) *Attorney, Agent, or Firm* — Avery Dennison Corporation

(57) ABSTRACT

The invention relates to a process for producing a printed image on a substrate comprising the steps of selecting eight or fewer process colors from a known process ink color set; providing two or more spot colors, forming a color set comprising the process colors and the spot colors; and optionally printing the image using the formed color set. The ratio of the number of spot colors to the number of process colors is at least 0.5:1.

20 Claims, 2 Drawing Sheets
(2 of 2 Drawing Sheet(s) Filed in Color)

(56) References Cited

U.S. PATENT DOCUMENTS

| | | |
|---|---|---|
| 7,426,060 B2 | 9/2008 | Nishide et al. |
| 7,715,042 B2 | 5/2010 | Yoshizawa et al. |
| 7,738,140 B2 | 6/2010 | Hancock et al. |
| 7,768,672 B2 | 8/2010 | Gil et al. |
| 7,995,238 B2 | 8/2011 | Nishide et al. |
| 8,179,566 B2 | 5/2012 | Mestha et al. |
| 8,351,100 B2 | 1/2013 | Mestha et al. |
| 8,427,697 B2 | 4/2013 | Yamamoto et al. |
| 8,842,333 B2 | 9/2014 | Iinuma |
| 8,955,940 B1 | 2/2015 | Smith et al. |
| 9,025,987 B2 | 5/2015 | Shindo et al. |
| 9,883,053 B2 * | 1/2018 | Morovic ............ H04N 1/00015 |
| 2003/0210298 A1 | 11/2003 | Madeley |
| 2005/0003113 A1 * | 1/2005 | Chen ..................... B41M 5/508 |
| | | 428/32.18 |
| 2005/0174588 A1 | 8/2005 | Kodama et al. |
| 2010/0245412 A1 * | 9/2010 | Page ..................... B41J 2/2107 |
| | | 347/6 |
| 2012/0090488 A1 | 4/2012 | Postle et al. |
| 2015/0158317 A1 | 6/2015 | Simoni et al. |
| 2015/0262047 A1 | 9/2015 | Tsuwano et al. |
| 2015/0339552 A1 | 11/2015 | Deshpande |
| 2016/0002482 A1 * | 1/2016 | Merchak ............. C09D 11/037 |
| | | 428/207 |

OTHER PUBLICATIONS

Written Opinion of the International Preliminary Examining Authority dated Feb. 5, 2018 issued in corresponding International Application No. PCT/US2017/022133 filed Mar. 13, 2017.

* cited by examiner

INK JET PRINT METHOD WITH INTEGRATED SPOT COLOR AND PROCESS COLOR

CROSS-REFERENCE TO RELATED APPLICATION

This application claims priority to U.S. Provisional Application No. 62/309,673 filed on Mar. 17, 2016, which is incorporated herein by reference in its entirety.

FIELD OF THE INVENTION

The present invention relates to processes for printing images with an ink jet printer. More specifically, the present invention relates to processes that employ both spot colors and process colors and yield a durable print image on a substrate. The invention further relates to ink jet printers for use in the processes, to durable ink color sets, and to processes for extending the color gamut of a process ink color set using both spot colors and process colors.

BACKGROUND

Ink jet printing systems are widely used in many different fields to produce printed images on a variety of substrates. Conventional color ink jet printers utilize basic process ink color sets, usually comprising from four to eight process colors, to form the color variations required to print the desired image. One of the well-known process ink color sets comprises four basic colors: cyan, yellow, magenta, and black, and is referred to as the CMYK color set or the CMYK process color method. Generally, the process colors in a process color set are typically used to produce a range of printed colors by combining various amounts of each of the process colors. Typically, in an ink jet printer, the CMYK colors are not actually blended together to form the desired color, rather very small drops of ink of different colors are deposited next to each other on the page. From a slight distance, the human eye tends to blend the individual ink drops together to form an area of the "mixed" color. The range of possible colors that may be printed by a printing process is referred to as the "gamut" of the process.

Using these techniques, color ink jet printers are generally able to reproduce a sufficient number of colors. In an effort to expand the gamut of the CMYK color set, other process inks have been added, thus creating other process color sets/methods, e.g., CMYKRGB and CMYKOG. Unfortunately, the gamuts of most of these color sets are much smaller than the total range of colors that can be seen. The gamuts of process color printers are smaller than the gamuts produced by traditional printing presses, such as offset, flexographic, gravure and screen printing presses. For example, flesh tone colors are not easily created using the CMYK color method, nor are fluorescent and metallic colors.

Also, many specialized colors cannot be easily formed via conventional process ink color sets. Some specialized colors are referred to as spot colors (also house colors or brand colors). These spot colors are customer-specific multi-pigmented colors often associated with a specific company, product, and/or brand name. Spot colors are generally formed at the molecular level and are made up by bending a variety of tints, hues and shades of colors. Examples include the precise hues of red and yellow used by Kodak, IBM Blue or Coca-Cola Red. Conventional ink color sets are usually unable to reproduce spot color vividness. This inability is perhaps due to the fact that in conventional process printing, every color is made up of overlapping process ink dots, as opposed to spot color printing, which involves application of solid areas of the pre-mixed spot colors. When CMYK inkjet printers try to achieve some of these specialized colors, processing problems ensue. In addition, there are often slight variations in the CMYK ink lots, so even if a specialized color of ink is achievable at one time, it may not be achievable at a later time, if ink of a different lot is used. Thus, the color gamuts provided by conventional ink color sets leaves much room for improvement.

In addition to the color gamut deficiency, conventional ink color sets/processes yield printed images that are insufficient for various applications. For example, problems are known to exist with the durability of process ink images. Specifically, for applications relating to large format signage, e.g., outdoor signage such as traffic signs, printed images produced from conventional ink color sets have been known to fade over time, to decrease in reflectivity, to vary between nighttime and daytime color, and/or to demonstrate other decreases in visual quality, e.g., sharpness of color and color contrast. These parameters are particularly germane to traffic signage because of the strict regulations relating thereto. Also, conventional images are known to have problems with consistency. That is to say these images suffer from defects such as banding and other types of color variations. In some cases, these types of defects are difficult to initially recognize due to the composition of the process color inks that are employed.

Further, conventional printers may include several process color channels and a small number of spot color channels (as compared to the number of process color channels). If an additional spot color is needed (as is often the case) one or more of the spot color channels must be flushed with cleaning solvents (often referred to as the longstore process). The longstore process is time consuming and generates much waste of inks and cleaning solvents. Further, the increased use of cleaning solvents has a significant negative effect on printer life.

US Patent Application Publication No. 2012/0090488 discloses that spot colors reproduce high value brand colors to supplement conventional process colors for printed images and packaging. This publication also discloses that a printing press can utilize hi-fidelity process inks (with at least three unique colors and black) and spot colors for printing solid brand colors and for printing over other colors to produce wide-gamut, half-toned color reproductions. The publication further discloses a method for printing logos on a substrate including (i) printing the spot colors using spot inks, and (u) [sic] printing the remainder of the image using a substituted original process ink set. Such method can alternatively include (in) [sic] reading the spectral characteristic of the inks, (iv) determining if any color in the image is identified by a color management method from the default process ink set palette, (v) processing the out-of-palette-colors using spot colors and the standard process ink set, and (vi) applying a tone scale value increase (TVI) to the process color sets. This publication, however, focuses exclusively on problems related to expansion of the gamut of conventional ink color sets and makes no mention of durability, consistency, control, or printer life, etc.

Other references also relate to expansion of color gamuts of conventional ink color sets and processes, many of which add process inks to the existing color set and some of which used process colors in attempts to simulate spot colors. Some references include U.S. Pat. Nos. 6,717,699; 7,004, 562; 7,032,517; 8,955,940; and US Patent Application Publication Nos. 2015/0158317 and 2015/0339552. These references, however, make no mention of incorporation of a spot color into an extended gamut process set.

Although the references may teach the use of revised ink color sets to expand color gamuts, a need still exists for improved ink color sets and processes relating thereto that provide the beneficial combination of improvements in printed image durability, printed image consistency, control, and printer lifetime (longstore process reduction/elimination) in addition to significant additional gamut expansion.

BRIEF DESCRIPTION OF THE DRAWINGS

The patent or application file contains at least one drawing executed in color. Copies of this patent or patent application publication with color drawings will be provided by the Office upon request and payment of the necessary fee.

SUMMARY OF THE INVENTION

Figure 1:
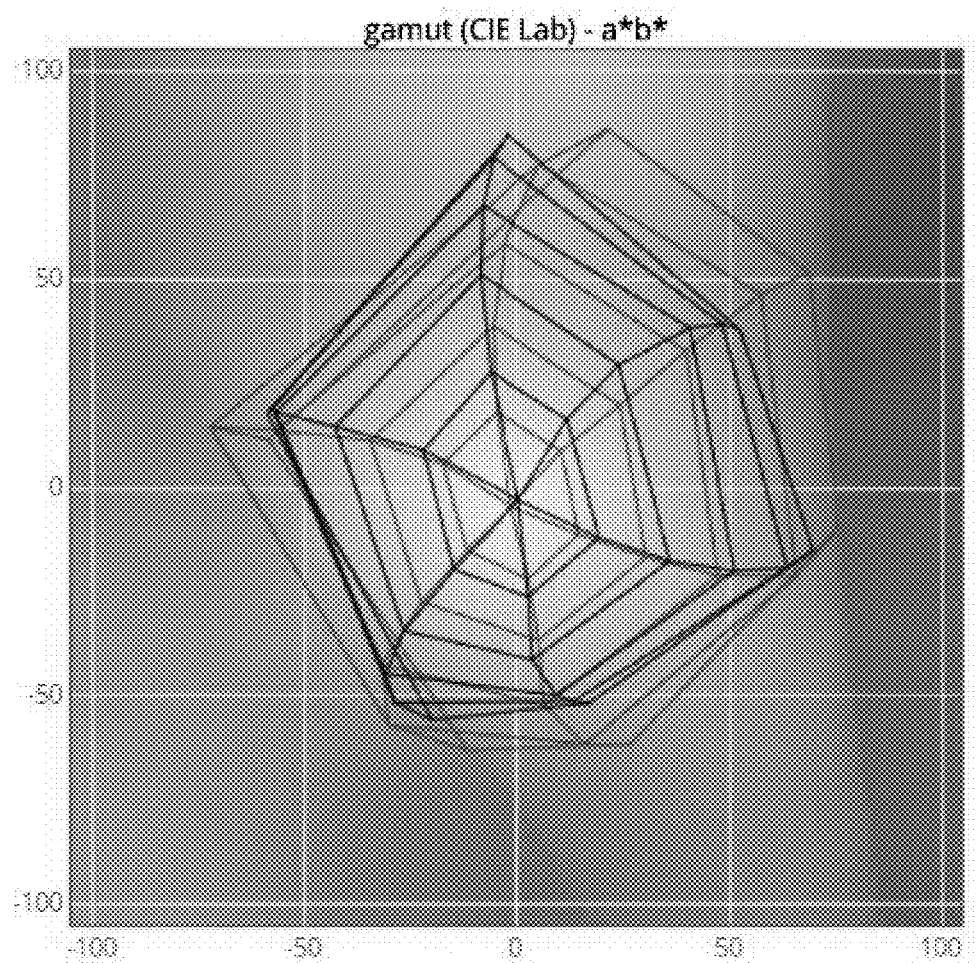
FIG. 1 is a CIELAB diagram showing the color gamut of a conventional CMYK color set versus the color gamut of the inventive ink color sets/processes.

In one embodiment, the invention relates to a process for producing a printed image on a substrate (or for forming a color set). The process comprises the steps of selecting eight or fewer process colors from a known process ink color set, providing two or more spot colors, forming a color set comprising the process colors and the spot colors wherein the ratio of the number of spot colors to the number of process colors is at least 0.5:1, optionally wherein the number of spot colors is greater than or equal to the number of process colors, and optionally printing the image using the formed color set, preferably using at least one process color and/or at least one spot color of the color set. In some cases, one or more of the spot colors correspond to one of the non-selected members of the known process ink color set. Some of the spot colors may correspond to a non-selected member of the known process ink color set. In some embodiments, the provided spot colors comprise an additional spot color wherein the additional spot color does not correspond to one of the non-selected members of the known process ink color set. The selecting may comprise selecting three or fewer process colors from a known process ink color set. In some cases, the formed color set comprises at least four colors, and three or fewer of the colors optionally comprise a process color, and two or more of the colors optionally comprise spot colors. In one embodiment, the formed color set comprises at least five spot colors or comprises six spot colors and two process colors. Preferably, the spot colors comprise at least one of spot yellow and spot black. The ratio of the number of spot colors to the number of process colors may be at least 1:1. The printed image may have an outdoor weather durability of at least 5 years (when employed with a suitable overlay film). The formed color set may have a color gamut having at least 10% more units than the known process ink color set, wherein the units are measured using Colorthink Pro 3.0. The formed color set may have a color gamut of at least 200,000 units. Preferably, the printing utilizes a driver, and the driver recognizes each spot color as a corresponding member of the known process ink color set, and the driver differentiates each spot color from the respective corresponding member of the known process ink color set (and utilized the colors accordingly). The invention further relates to printed images produced via the inventive processes.

In one embodiment, the invention relates to an inkjet printer. The printer comprises color channels, e.g., at least three color channels, with each color channel comprising a respective color. Six or fewer, e.g. three or fewer, of the channels may comprise process colors and two or more of the channels, e.g., at least five, may comprise spot colors. The ratio of the number of spot colors (or channels containing spot colors) to the number of process colors (or channels containing process colors) may be at least 0.5:1. The number of spot colors may be greater than or equal to the number of process colors. Preferably, the printer comprises at least six channels and three or fewer of the colors comprise a process color and two or more of the colors comprise spot colors, e.g., the printer comprises six channels comprising spot colors, optionally including spot yellow and spot black, and two channels comprising process colors. The ratio of channels comprising spot colors to the channels comprising process colors may be at least 1:1. The process colors may be members selected from a known process ink color set. Preferably the printer comprises the driver, and the printer may not comprise a sub-tank.

The invention, in some embodiments, further relates to a process for printing a durable image on a traffic sign comprising the steps of providing a color set. The color set comprises six or fewer process colors and two or more spot colors. The number of spot colors may be greater than or equal to the number of process colors. The ratio of the number of spot colors to the number of process colors may be at least 0.5:1. The process further comprises the step of printing the image using the color set, and the printed image may have the characteristics discussed herein. The formed color set may have a color gamut as discussed herein.

In addition, the invention relates to a process for producing an durable ink color set comprising the steps of: 1) identifying a known process ink color set comprising at least four colors; 2) selecting two or more process colors from the known process ink color set; and 3) substituting each selected process color with a spot color corresponding to the respective process color to form the improved ink color set. The ratio of the number of substituted spot colors to the number of process colors in the improved ink color set may be at least 0.5:1. The invention may further relate to a process for extending the color gamut of a process ink color set comprising at least one process color. The process may comprise the steps of providing a known process ink color set comprising at least one process color, combining two or more spot colors with the at least one process color to form an improved color ink set. The ratio of the number of spot colors to the number of process colors in the improved ink color set may be at least 0.5:1. The improved ink color set has a color gamut as discussed herein. The process may further comprise selecting one or more colors from the process ink color set and substituting each selected process color with a spot color corresponding to the respective process color to form the improved ink color set.

The invention may also relate to a process for producing a printed image on a substrate, comprising the steps of providing a color set and printing the image using the color set. The color set may comprise six or fewer process colors and two or more spot colors, and the ratio of the number of spot colors to the number of process colors may be at least 0.5:1. The printed image may have the characteristics discussed herein.

DETAILED DESCRIPTION OF THE INVENTION

Introduction

The present invention relates to unique ink color sets of process colors and spot colors that surprisingly and unexpectedly provide for a combination of beneficial performance improvements when utilized in ink jet printing processes. These benefits include improvements in printed image (weather) durability, printed image consistency, and printer lifetime, in addition to significant additional gamut expansion. Further, the present invention provides for increased printer spot color printing capability, e.g., the ability to utilize more spot colors than conventional printers, for example more than two spot colors, more than three spot colors, more than four spot colors, more than five spot colors, or more than six spot colors. While some conventional ink color sets utilize one or two spot colors along with several process colors to achieve marginal improvements in gamut expansion, these conventional color sets fail to achieve the aforementioned combination of advantageous improvements.

Traditionally, color ink jet printers utilize basic process ink color sets to produce a range of printed colors by combining various amounts of each of the process colors, typically referred to as the "gamut." Recently, efforts have been made to expand color gamut(s) by using spot colors reproduce high value brand colors to supplement conventional process colors for printed images and packaging (see, e.g., US Patent Application Publication No. 2012/0090488). In such cases, (a small number of) spot colors are added to known process ink color sets and used in place of the combination of process colors that was previously used to mimic the spot color. These recent efforts, however, essentially teach the use of only one or two spot colors, specifically spot red and spot orange, to supplement a process color set, e.g., the CMYKOG color set. Thus, two spot colors and four process colors are employed. And the reference(s) make no mention of the effects of spot colors or the combination of spot colors and process colors on overall printed image durability (outdoor weathering), printed image consistency, control, and/or printer life. Importantly, the relationship between the number of spot colors and the number of process colors in an ink color set/process and the effects of this relationship on the properties of the printed image has not been explored or documented in the reference(s).

Ink Color Sets and Printing Processes

It has now been discovered that the use of ink color sets comprising high numbers of spot colors (in an ink jet printing process), in addition to the color gamut expansion, has a beneficial effect on the properties of the resultant printed image, e.g., durability. Problems are known to exist with the durability of process ink images. Conventional printed images have been known to fade over time, to decrease in reflectivity, to vary between nighttime and daytime color, and/or to demonstrate other decreases in visual quality, e.g., sharpness of color and color contrast.

By utilizing an ink color set that employs more colors and process colors employed at a ratio of at least 0.5:1, optionally wherein the number of spot colors is greater than or equal to the number of process colors, a highly durable image may be produced. This type of highly durable image may be particularly advantageous, for example, when employed in applications relating to large format signage, e.g., outdoor signage such as traffic signs. Durability is particularly germane to traffic signage because of the strict regulations relating thereto. Without being bound by theory, it is believed that the use of greater amounts of spot colors and the actual composition of the spot colors contribute to the improvements in the performance characteristics of the image. For example, spot colors may contain higher stability pigments and/or UV stabilizers (as compared to the pigments of process colors), which may contribute to the improvements in performance characteristics of the image.

In addition to the durability benefits, the inventive ink color sets and processes provide for unexpected improvements in printed image consistency. Conventional images, e.g., those printed using process ink color sets such as CMYK, suffer from defects such as banding and other types of color variations. In some cases, these types of defects are difficult to initially recognize due to the printing process (overlay of process ink spots) and/or the actual composition of the process color inks that are employed. However, when the inventive ink color sets and processes are utilized, defects, e.g., banding and other types of color variation, are much more easily recognized. Without being bound by theory, it is postulated that because more of the spot colors are directly printed as a solid color, e.g., not overlaid, defects may be more recognizable. Because of this improved recognition, consistency and quality control of printed images is advantageously improved. Still further, the inventors have found that, because of the properties of the spot colors and the improved ease of making opacity adjustments, the use of the inventive ink color sets provides for better image control. In some cases, the high amount of spot colors in the inventive ink color sets may be printed simply by setting the opacity (coverage) percentage to give a (single) solid color print. In contrast conventional process color sets often rely on the preset profiles, which must be calibrated on each specific substrate sheet. These advantageous combinations of image performance characteristics achieved by the present ink color sets and processes could not have been predicted.

Also, by employing spot colors and process colors as discussed herein, the inventive ink color sets and processes lead to surprising improvements in printer life and overall process efficiency, e.g., waste of ink and/or cleaning solvent. This benefit is especially relevant to instances where greater numbers of spot colors are required to print the image. In these cases, the substitution of spot colors for process colors allows for more spot colors to be used in a color set, which reduces/eliminates the need for the longstore process and provides for an accompanying benefit in printer life. As noted above, the reference(s) fail to recognize the effects of spot colors or the combination of spot colors and process colors on the resultant image.

Accordingly, in one embodiment, the invention relates to processes for producing a printed image on a substrate. The processes include the steps of selecting eight or fewer process colors, e.g., seven or fewer, six or fewer, five or fewer, four or fewer, three or fewer, or two or fewer, from a known process ink color set; providing one or more spot colors, e.g., two or more, three or more, four or more, five or more, six or more, seven of more, eight or more, nine or more, or ten or more, and forming a color set. The color set comprises the (selected) process colors and the (provided) spot colors. In one embodiment, the formed color set comprises at least three total colors (process colors and spot colors, combined), e.g., at least four, at least five, at least six, at least seven, or at least eight. The processes may further comprise the step of printing the image(s) using the formed color set. In some cases, however, the inventive process cover the formation of the color set and/or the printer in which the color set is employed, regardless of whether an image is printed or not. Preferably, the printing of the image employs at least one process color and/or at least one spot color of the color set. The invention also contemplates the printed images formed using the inventive ink color sets/processes. As discussed herein, the use of ink color sets that comprise more spot colors than process colors provides for unexpected combinations of benefits.

Generally speaking (and in the embodiments discussed herein), the ratio of the number of spot colors to the number of process colors may be at least 0.5:1, e.g., at least 1:1, at least 1.5:1, at least 2:1, at least 2.5:1, at least 3:1, at least 4:1, or at least 5:1. In some cases, the ratio of the number of spot colors to the number of process colors is greater than 0.5:1, e.g., greater than 1:1, greater than 1.5:1, greater than 2:1, greater than 2.5:1, greater than 3:1, greater than 4:1, or greater than 5:1. In some cases, the number of spot colors in the formed color set may be greater than (or optionally equal to) the number of process colors. These limits and ranges are applicable to the color sets/processes discussed herein.

The known process ink color set may vary widely. The known process ink color set comprises any number of known process colors, e.g., one or more, two or more, three or more, or four or more. Many process ink color sets are and have been in use for some time. Examples include the CMYK, CMYKOG, CMYKRGB, and CcMmYKcolor sets (where "c" and "m" refer to lighter shades of cyan and magenta, respectively). This listing is by no means limiting. Broadly speaking the known process ink color set may be any color set that comprises a known process color. In one embodiment, the known process ink color set does not comprise any spot colors. In one embodiment, the known ink color set is the CMYK color set.

One important feature of the present invention is the use of high amounts of spot colors, preferably, greater amounts of spot colors (as compared to the amount of process colors). For example, the ratio of the number of spot colors to the number of process colors may be as discussed herein. Many combinations of spot colors and process colors are contemplated as long as the ratio of the number of spot colors to the number of process colors is at least 0.5:1 (greater than 0.5:1). For example, the formed color set may comprise two spot colors and one process color; three spot colors and one process colors; three spot colors and two process colors; four spot colors and one, two, or three process colors; five spot colors and one, two, three, or four process colors; or six spot colors and one, two, three, four, or five process colors. Preferably, the formed color set comprises five spot colors and three process colors or six spot colors and two process colors.

In some preferred embodiments, the spot color(s) correspond to one of the non-selected members of the known process ink color set. Thus, the spot color(s) substitute one or more of the colors that were originally in the known process color ink set, e.g., the spot color takes the place of the respective process color, as opposed to the mere addition of a spot color to a known process ink color set (wherein both the spot color and the corresponding process color exist in the color set). In the inventive processes, the spot colors are employed as both spot colors and as process colors. In preferred embodiments, during printing operations, at least some of the spot colors serve as both the respective spot color and as the process color that was substituted (by the spot color). The respective spot color may be used where the related process color would have been previously used. For example, if the known process ink color set is the CMYK color set, the Y and/or K colors may be replaced by spot yellow and/or spot black. And, during printing operations, the spot yellow is used as both spot yellow and Y and the spot black is used as spot black and K. The inventors have found that by substituting several spot colors for the corresponding process colors, the color gamut can be advantageously expanded. Without being bound by theory, it is believed that the spot colors may possess higher degrees of color depth. The increases in color depth, in turn, provide for greater depth in the colors that are formed via combinations that employ these spot colors (in the ink jet printing process). In some embodiments, the ink color set further comprises one or more additional spot color in addition to the spot color(s) that correspond to one of the non-selected colors.

It is noted that transparency may be an issue in using a spot color as a process color. Generally, brand color inks are not tested as critically for transparency since they are not used in a process set. Process inks typically must be transparent to show the color underneath to form the 2-color overprint. Thus, in exemplary embodiments of the present invention, where a spot color is substituted for a process color, the spot color ink may be made to be sufficiently transparent so as to facilitate its use for overprinting.

In one embodiment, the spot colors of the ink color set comprise at least one of spot yellow and spot black (spot yellow and/or spot black). The inventors have surprisingly found that the inclusion of spot yellow and/or spot black to the ink color set provides for significant expansion of the color gamut. Without being bound by theory, it is believed that spot black colors have more depth of color and that this depth of color combines particularly well with spot yellow and with other process colors.

In some cases, the use of the inventive ink color sets/processes provides for expansion of printer capability to print multiple spot colors. For example, by employing the inventive ink color sets, spot color printing capability, e.g., the ability to print many spot colors, is significantly expanded, e.g., by at least 10%, at least 25%, at least 40%, at least 50%, at least 75% or at least 100%. In some cases, spot colors may occupy three or more channels of an eight channel printer, e.g., four or more, five or more, or six or more. This feature is a highly desired feature for traffic signage industry since more spot colors could be printed without the need to physically increase the ink channels.

In some cases the formed ink color setshave a color gamut volume of at least 200,000 units, as measured using Color-Think Pro 3.0 system, e.g., at least 225,000 units, at least 250,000, at least 275,000, at least 300,000, at least 325,000, at least 350,000, at least 375,000, at least 400,000, at least 425,000, at least 450,000, at least 475,000, at least 500,000, at least 525,000, at least 550,000, at least 575,000, at least 600,000, at least 650,000, or at least 700,000. The Color-Think Pro 3.0 imaging software system is a well-known system used to gauge color gamuts available from CHROMiX, Inc. (Seattle, Wash.). In terms of ranges, the formed ink color set has a color gamut volume ranging from 200,000 units to 1,000,000 units, e.g., from 300,000 units to 900,000 units, from 450,000 units to 900,000 units, from 450,000 units to 750,000 units, from 500,000 units to 700,000 units, from 500,000 units to 600,000 units, or from 525,000 units to 575,000 units.

In one embodiment, the formed ink color set may have an improvement of at least 10% more units over a similar known ink color set that does not employ the required number of spot colors, e.g., at least 20%, at least 25%, at least 30%, at least 35%, at least 37%, at least 40%, at least 45%, at least 50%, at least 60%, or at least 75%. Further, the improved contrast and reflectivity that have been discovered is particularly well-suited for use in large format signage applications, e.g., traffic signs. The discussion of measurement of expansion of the color gamut is applicable to embodiments relating to the ink color sets and also to the processes and printers of the present invention.

In some cases, the formed ink color sets may provide for color gamuts having similar numerical ranges and limits, but using a CIELAB system (and CIELAB units).

Figure 2:
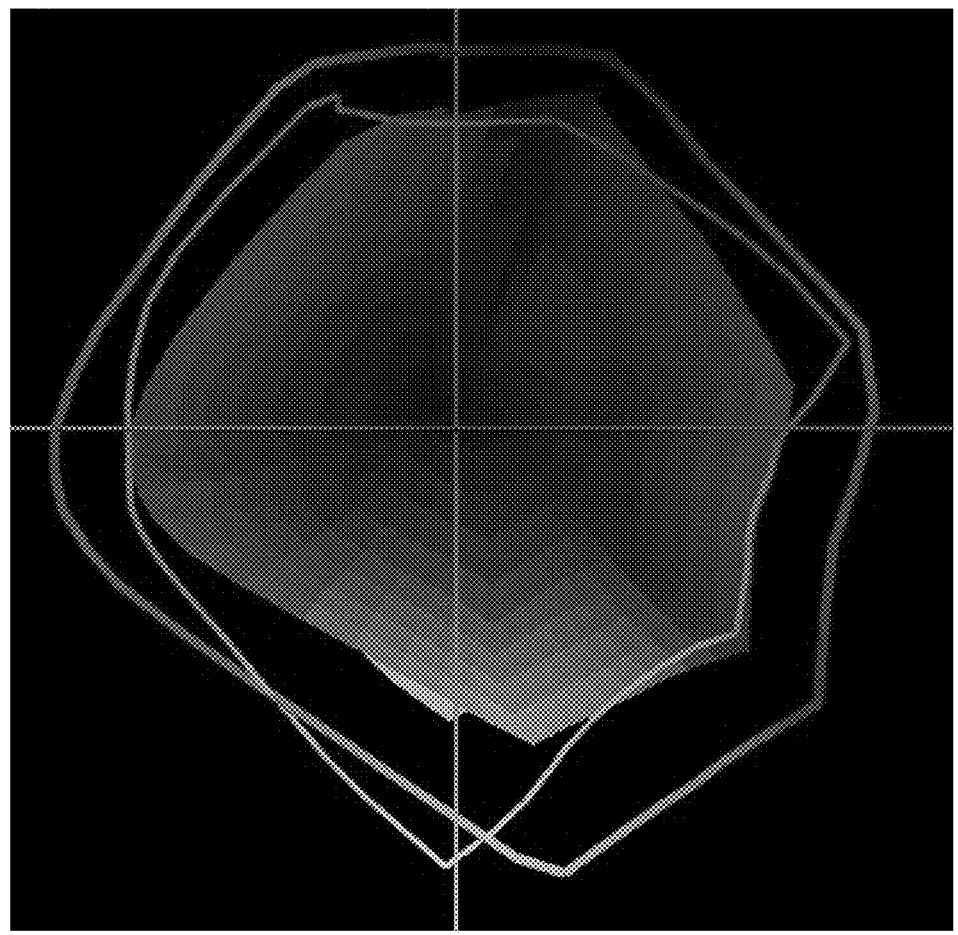
FIG. 2 is a diagram showing the color gamut of a conventional CMYK color set versus the color gamut of the inventive ink color sets/processes.

FIGS. 1 and 2 show the expansions of color gamut demonstrated by the inventive color sets as compared to the conventional CMYK color set. In particular, FIG. 1 compares a CIELAB Diagram Gamut Comparison of conventional CMYK color set and an improved color set utilizing two spot colors as substitutes for the respective process color in accordance with the present invention. The heavier (darker) lines indicate the color gamut for the conventional CMYK color set. The lighter lines indicate the color gamut for the inventive color sets. As shown, the new color set has an overall gamut increase of 37%. In some cases, there may be a minor loss of some color areas, the surprising beneficial expansion of color gamut in other areas outweighs the minor color loss.

FIG. 2 is a plot using a different imaging system, the ColorThink Pro 3.0 system. FIG. 2 compares a conventional CMYK color set and an improved color set utilizing two spot colors as substitutes for the respective process color in accordance with the present invention. In FIG. 2, the lighter lines indicate the color gamut for the conventional CMYK color set. The heavier (thicker) lines indicate the color gamut for the inventive color sets.

In some cases, the inventive printing processes utilize a driver that is responsible for recognizing the colors of a color set and facilitating the printing operation. Preferably, the driver is capable of recognizing each spot color as a corresponding member of the known process ink color set, and differentiating each spot color from the respective corresponding member of the known process ink color set. In some cases the driver is configured such that it employs the spot colors as both process colors and spot colors. The driver has the capability of employing the spot color as a substitute for a particular process color that is listed in a design file (as discussed herein).

In other embodiments, some of the spot colors may simply add to the color set. For example, the spot colors may be present along with the corresponding member of the process ink set. For example, an ink color set may comprise process color C (cyan) along with spot blue, spot red. In such an ink color set the spot blue color is related to the C process color. In other cases, some of the spot colors may not have a relationship to any of the process colors in the process ink set. For example, an ink color set may comprise process colors C and M (magenta) along with spot black, spot yellow, and spot white. In such an ink color set the spot colors are not directly related to the C and M process colors.

In some embodiments, the present invention relates in particular to processes for printing a durable image on a traffic sign. As noted above, the printing standards and regulations relating to large format signage are much more strict than for printing on other substrates, e.g., textiles or packaging. These processes may comprise the step of providing the ink color set(s) described herein, e.g., an ink color set comprising six or fewer process colors and two or more spot colors. The number of spot colors may be greater than the number of process colors and/or the ratio of the number of substituted spot colors to the number of process colors in the improved ink color set may be as described herein. The process further comprises the step of printing the image using the color set, e.g., by using at least one process color and at least one spot color of the color set.

In one embodiment, the images are printed using at least one of spot yellow and spot black (spot yellow and/or spot black). In addition to the advantages discussed above with respect to these colors (among others), the use of spot yellow and spot black provide for particular benefits relating to outdoor signage. For example, the use of spot yellow and/or spot black provided for color gamut expansion in particular areas that are advantageous to signage, e.g., higher visibility colors.

In some embodiments, especially with regard to the traffic signage printing, the use of spot colors provides for the use of more spot colors in a printer. In traffic signage printing, there are at least four other (primary) spot colors including green (or Worboy green), red, blue and brown in traffic signage industry. The number of ink channels in printers is often limited, e.g., less than ten channels. Thus, it is often a challenge to print all of the major spot colors along with process colors, e.g., CMYK, for printers with less than ten ink channels. By substitution some process ink channels, the spot color printing capability could be significantly improved as discussed herein.

The invention also relates to processes for producing a durable ink color set and the resultant durable ink color sets. The processes may comprise the steps of identifying a known process ink color set comprising at least four colors. Known process ink colors are described herein. The processes, in some embodiments, comprise the steps of selecting one or more, e.g., two or more, process colors from the known process ink color set and substituting each selected process color with a spot color to form the improved ink color set. The spot color may correspond to the respective process color. In these processes, the known ink set is modified to replace the process inks with spot colors that are similar to the process inks to be replaced. For example, starting with a known CMYK system, the C, Y, and K process colors may be substituted with spot blue, spot yellow, and spot black colors. Preferably, the number of substituted spot colors to the number of process colors in the improved ink color set is as is described herein. The substitution of the spot inks for the process inks provides for the unexpected benefits discussed herein.

In some cases the substitution comprises the step of identifying one or more process colors that were selected for substitution and determining a substitute spot color corresponding thereto. The selected process colors are then substituted with the substitute spot color, e.g., the substitute spot color(s) take the place of the selected process color(s), thus forming the improved ink color set (as discussed herein).

The present invention also contemplates extension of the color gamut of a known process ink color set, e.g., a process ink color set that comprises at least one (original) process color. The processes may comprises the steps of providing a known process ink color set and combining two or more spot colors with the process color(s) to form an improved color ink set. The ratio of the number of spot colors to the number of process colors in the improved ink color set is as discussed herein. The combination of the spot colors and process colors unexpectedly provides for significant expansion of the color gamut. These expansions are quantified and discussed herein.

The combination of the process colors and spot colors may be achieved using the processes/techniques discussed herein.

In one embodiment, the present invention relates broadly to processes for producing a printed image on a substrate. The process comprises the step of providing a color set comprising six or fewer process colors and two or more spot colors. The ratio of the number of spot colors to the number of process colors is as described herein. The process further comprise the step of printing the image using the color set, e.g., using at least one process color and at least one spot color of the color set.

Generally speaking, the process steps discussed herein may be used in combination with other steps, features, and/or characteristics also discussed in this application. Similarly, the features and characteristics of the color ink sets discussed herein may be combined with other features and characteristics also discussed in this application.

Ink Jet Printers

In addition to the aforementioned processes and color sets, the invention further relates to ink jet printers. The ink jet printers comprise, among other components, a plurality of color channels, e.g., at least three channels, at least four channels, at least five channels, at least six channels, at least seven channels, at least eight channels, at least nine channels, or at least ten channels. Each of the channels comprises or is associated with a respective ink or ink color. The channels may hold or contain the respective inks, which are used to create the images. Six or fewer of the channels, e.g., five or fewer, four or fewer, three or fewer, or two or fewer, comprise process colors. In preferred embodiments, four, three or two of the channels comprise a process color. Two or more of the channels, e.g., e.g., three or more, four or more, five or more, six or more, seven of more, eight or more, nine or more, or ten or more, comprise spot colors. The number of channels that contain spot colors (and thus the number of spot colors used by the printer(s)) may be greater than the number of channels that contain process colors (and thus the number of process colors used by the printer(s)). In some instances, the ratio of channels comprising spot colors to the channels comprising process colors is as described herein with respect to numbers of spot and process colors. By utilizing greater numbers of spot color channels, the inventive printers lead to surprising improvements in printer life and overall process efficiency. For instance, in many applications, greater numbers of spot colors are required to print an image. Because the inventive printers utilize greater amounts of spot color channels, the need to change out the channels, e.g., to remove one spot color and replace it with another, is minimized or eliminated. Accordingly, waste of ink and cleaning solvents that is required for channel change outs (the long store process) is also minimized or eliminated. Further, because use of the aggressive cleaning solvents may be reduced, there is an accompanying benefit in printer life.

In some embodiments, a stable printing system, using well-known printing processes may be provided wherein spot colors may be printed as solids for logos and brand names, in tone scales for vignettes, and to provide high fidelity color images (with process colors). In some of these embodiments, changes in a given print job will only require changing those print stations that have different spot colors contained in the next print job.

In some preferred embodiments, the printer comprises at least six channels and three or fewer of the colors comprise a process color and two or more of the colors comprise spot colors. The printer may preferably comprise six channels comprising spot colors and two channels comprising process colors.

In one embodiment, the spot color channels comprise at least one of spot yellow and spot black (spot yellow and/or spot black). Thus, the inventive printers provide for the advantages discussed above with respect to these colors (among others).

The process colors, in some embodiments, are selected from a known process ink color sets, some of which are described herein.

The inventive printers may further comprise a driver. The driver may function as described herein. In addition to the color channels, the inventive printers may further comprise other well-known printer componentry, e.g., cartridge adapters, dryers, etc.

In one embodiment, the inventive printers do not comprise a sub-tank. A sub-tank is a container that is generally known to function as a reservoir to store a quantity of ink (in addition to the ink stored in the cartridge. Typically, each channel has a sub-tank associated therewith. In some cases, the sub-tank(s) allows the printer to continue to print images when one or more channels are low on the respective ink cartridge. The printer can be configured to send an alarm when the respective channel is low on the respective ink. The sub-tank may allow the printer to continue to print while one or more of the channels is low on ink. The sub-tank(s), however, require a significant amount of space in the printer assembly. In addition, the sub-tank(s) increase waste during the longstore process, due to inter alia ink loss. Because the inventive printers effectively utilize spot colors as described, the long store process is reduced or eliminated and, beneficially, the increased waste associated with the sub-tank(s) can be avoided.

Performance Characteristics

The use of the inventive ink color sets/processes provides for significant improvements in inter alia gamut expansion, process efficiencies, and printed image characteristics.

Because the inventive ink color sets are employed to print the image, the printed images generally will have improved durability. For example the printed image may have an outdoor weather durability of at least 5 years, e.g., at least 5.5 years, at least 6 years, at least 6.5 years, at least 7 years, at least 7.5 years, at least 8 years, at least 8.5 years, at least 9 years, at least 10 years, at least 12 years, at least 14 years, or at least 15 years, when a suitable overlay film is employed with the printed image.

In some embodiments, the color differences are significantly reduced using the inventive ink color sets/processes. One way to quantify these differences is $\Delta E$, which is known to describe color differences (often in the CIELAB color space). The changes may be measured before and after durability or weather testing, and the $\Delta E$ may be calculated from the before and after measurements.

For example, when tested, the printed image (or the durable image) formed by the inventive processes may have a $\Delta E$ of less than 5.0, e.g., less than 4.75, less than 4.5, less than 4.25, less than 4.0, less than 3.75, less than 3.5, less than 3.25, less than 3.0, less than 2.75, less than 2.5, less than 2.25, less than 2.0, less than 1.75, less than 1.5, less than 1.0, less than 0.75, less than 0.5, or less than 0.25. In preferred embodiments, the $\Delta E$ is less than 3.5. The testing may be Xenon weathering (XePVL) for a particular time period, e.g., 4,000 hours, as determined in accordance with ASTM G155-13 or ASTM D4956-13 (2016 or current year).

In particular embodiments, a dark green image formed by the inventive processes has a $\Delta E$ of less than 3.75, e.g., less than 3.5, less than 3.25, less than 3.0, less than 2.75, less than 2.5, less than 2.25, less than 2.0, less than 1.75, less than 1.5, less than 1.0, less than 0.75, less than 0.5, or less than 0.25, when tested under Xenon weathering as discussed herein.

In another embodiment, a green image formed by the inventive processes has a of less than 3.75, e.g., less than 3.5, less than 3.25, less than 3.0, less than 2.75, less than 2.5, less than 2.25, less than 2.0, less than 1.75, less than 1.5, less than 1.0, less than 0.75, less than 0.5, or less than 0.25, when tested under Xenon weathering as discussed herein.

In another embodiment, a yellow image formed by the inventive processes has a ΔE of less than 3.5, e.g., less than 3.25, less than 3.0, less than 2.75, less than 2.5, less than 2.25, less than 2.0, less than 1.75, less than 1.5, less than 1.0, less than 0.75, less than 0.5, or less than 0.25, when tested under Xenon weathering as discussed herein.

Printing Processes

The mechanics of the printing steps employed by the inventive processes may vary widely. The art is replete with teachings relating to the printing process itself. Examples include U.S. Pat. No. 6,637,860, the entire contents of which are hereby incorporated by reference.

EXAMPLES

Example 1

A dark green image was printed using a color ink set in accordance with the present invention. The color ink set contained process C and M along with spot yellow and spot black. A comparative image was prepared in a similar manner but using a conventional CMYK color ink set. The printed dark green image of the present invention yielded a ΔE of 2.4 after 4,000 hrs Xenon weathering determined in accordance with ASTM G155-13 and ASTM D4956-13 (2016 or current year). In contrast, the comparative image tested under the same conditions yielded a ΔE of 3.5.

Example 2

A green image was printed using a color ink set in accordance with the present invention. The color ink set contained process C and M along with spot yellow and spot black. A comparative image was prepared in a similar manner but using a conventional CMYK color ink set. The printed green image of the present invention yielded a ΔE of 3.1 after 4,000 hrs Xenon weathering determined in accordance with ASTM G155-13 and ASTM D4956-13 (2016 or current year). In contrast, the comparative image tested under the same conditions yielded a ΔE of 3.5.

Example 3

A yellow image was printed using a color ink set in accordance with the present invention. The color ink set contained process C and M along with spot yellow and spot black. A comparative image was prepared in a similar manner but using a conventional CMYK color ink set. The printed yellow image of the present invention yielded a ΔE of 3.1 after 4,000 hrs Xenon weathering determined in accordance with ASTM G155-13 and ASTM D4956-13 (2016 or current year). In contrast, the comparative image tested under the same conditions yielded a ΔE of 3.5.

The following embodiments are contemplated. All combinations of features and embodiments are contemplated.

Embodiment 1 a process for producing a printed image on a substrate (or producing a color set), comprising: selecting eight or fewer process colors from a known process ink color set; providing two or more spot colors, forming a color set comprising the process colors and the spot colors wherein the ratio of the number of spot colors to the number of process colors is at least 0.5:1; and optionally printing the image using the formed color set.

Embodiment 2 the embodiment of embodiment 1 wherein one or more of the spot colors correspond to one of the non-selected members of the known process ink color set.

Embodiment 3 the embodiment of any one of embodiments 1 and 2 wherein the provided spot colors comprise an additional spot color wherein the additional spot color does not correspond to one of the non-selected members of the known process ink color set.

Embodiment 4 the embodiment of any one of embodiments 1-3 wherein some of the spot colors correspond to a non-selected member of the known process ink color set.

Embodiment 5 the embodiment of any one of embodiments 1-4 wherein the printing comprises printing the image using at least one process color and/or at least one spot color of the color set.

Embodiment 6 the embodiment of any one of embodiments 1-5 wherein the selecting comprises selecting three or fewer process colors from a known process ink color set.

Embodiment 7 the embodiment of any one of embodiments 1-6 wherein the formed color set comprises at least four colors.

Embodiment 8 the embodiment of any one of embodiments 1-7 wherein three or fewer of the colors comprise a process color and two or more of the colors comprise spot colors.

Embodiment 9 the embodiment of any one of embodiments 1-8 wherein the formed color set comprises at least five spot colors.

Embodiment 10 the embodiment of any one of embodiments 1-9 wherein the formed color set comprises six spot colors and two process colors.

Embodiment 11 the embodiment of any one of embodiments 1-10 wherein the spot colors comprise at least one of spot yellow and spot black.

Embodiment 12 the embodiment of any one of embodiments 1-11 the ratio of the number of spot colors to the number of process colors is at least 1:1.

Embodiment 13 the embodiment of any one of embodiments 1-12 wherein the printed image has an outdoor weather durability of at least 5 years.

Embodiment 14 the embodiment of any one of embodiments 1-13 wherein the formed color set has a color gamut of at least 200,000 units, as measured using Colorthink Pro 3.0.

Embodiment 15 the embodiment of any one of embodiments 1-14 wherein the formed color set has a color gamut having at least 10% more units than the known process ink color set, wherein the units are measured using Colorthink Pro 3.0.

Embodiment 16 the embodiment of any one of embodiments 1-15 wherein the printing utilizes a driver and wherein the driver recognizes each spot color as a corresponding member of the known process ink color set, and wherein the driver differentiates each spot color from the respective corresponding member of the known process ink color set.

Embodiment 17 a printed image produced via the process of any one of embodiments 1-16.

Embodiment 18 an inkjet printer, comprising: color channels with each comprising a respective color; six or fewer of the channels comprising process colors; two or more of the channels comprising spot colors, wherein the ratio of channels comprising spot colors to the channels comprising process colors is at least 0.5:1.

Embodiment 19 the embodiment of embodiment 18, wherein the printer comprises at least three color channels.

Embodiment 20 the embodiment of one of embodiment 18 and embodiment 19, wherein three or fewer of the channels comprising process colors.

Embodiment 21 the embodiment of any one of embodiments 18-20, wherein the printer comprises at least six channels and wherein three or fewer of the colors comprise a process color and two or more of the colors comprise spot colors.

Embodiment 22 the embodiment of any one of embodiments 18-21 wherein the ratio of channels comprising spot colors to the channels comprising process colors is at least 1:1.

Embodiment 23 the embodiment of any one of embodiments 18-22 wherein at least five of the channels comprise spot colors.

Embodiment 24 the embodiment of any one of embodiments 18-23 wherein the printer comprises six channels comprising spot colors and two channels comprising process colors.

Embodiment 25 the embodiment of any one of embodiments 18-24 wherein the spot colors comprise at least one of spot yellow and spot black.

Embodiment 26 the embodiment of any one of embodiments 18-25 wherein the process colors are members selected from a known process ink color set.

Embodiment 27 the embodiment of any one of embodiments 18-26 further comprising a driver.

Embodiment 28 the embodiment of embodiment 27 wherein the recognition device recognizes each spot color and utilizes each of the recognized spot color as the corresponding non-selected member of the known process ink color set.

Embodiment 29 the embodiment of any one of embodiments 18-28, wherein the printer does not comprise a sub-tank.

Embodiment 30 a process for printing a durable image on a traffic sign, comprising providing a color set comprising: six or fewer process colors; and two or more spot colors, wherein the ratio of the number of spot colors to the number of process colors is at least 0.5:1; and printing the image using the color set, wherein the printed image has an outdoor weather durability of at least 5 years.

Embodiment 31 the embodiment of embodiment 30 wherein printing comprises printing the image using at least one process color and/or at least one spot color of the color set.

Embodiment 32 the embodiment of any one of embodiment 30 and 31 wherein the two or more spot colors comprise at least one of spot yellow and spot black.

Embodiment 33 the embodiment of any one of embodiments 30-32 wherein the formed color set has a color gamut of at least 200,000 units, as measured using Colorthink Pro 3.0.

Embodiment 34 the embodiment of any one of embodiments 30-33 wherein the formed color set has a color gamut having at least 10% more units than the known process ink color set, wherein the units are measured using Colorthink Pro 3.0.

Embodiment 35 a printed image produced via the embodiment of any one of embodiments 30-34.

Embodiment 36 a process for producing an durable ink color set, comprising: 1) identifying a known process ink color set comprising at least four colors; 2) selecting two or more process colors from the known process ink color set; 3) substituting each selected process color with a spot color corresponding to the respective process color to form the improved ink color set; wherein the ratio of the number of substituted spot colors to the number of process colors in the improved ink color set is at least 0.5:1.

Embodiment 37 the embodiment of embodiment 36 wherein the substituted spot colors are utilized as both the respective process color and the substituted spot color.

Embodiment 38 a process for extending the color gamut of a process ink color set comprising at least one process color, comprising: providing a known process ink color set comprising at least one process color; combining two or more spot colors with the at least one process color to form an improved color ink set; wherein the ratio of the number of spot colors to the number of process colors in the improved ink color set is at least 1:1.

Embodiment 39 the embodiment of embodiment 38 wherein the improved ink color set has a color gamut of at least 200,000 units, as measured using Colorthink Pro 3.0.

Embodiment 40 the embodiment of any one of embodiment 38 and embodiment 39 wherein the improved ink color set has a color gamut having at least 10% more units than the known process ink color set, wherein the units are measured using Colorthink Pro 3.0.

Embodiment 41 the embodiment of any one of embodiments 38-40 further comprising selecting one or more colors from the process ink color set.

Embodiment 42 the embodiment of any one of embodiments 38-41 further comprising substituting each selected process color with a spot color corresponding to the respective process color to form the improved ink color set.

Embodiment 43 a printed image produced using the improved color ink set of any one of embodiments 38-41

Embodiment 44 a process for producing a printed image on a substrate, comprising: providing a color set comprising: six or fewer process colors; and two or more spot colors, wherein the ratio of the number of spot colors to the number of process colors is at least 0.5:1; printing the image using the color set.

Embodiment 45 the embodiment of embodiment 44 wherein the printed image has an outdoor weather durability of at least 5 years.

Embodiment 46 a printed image produced using the improved color ink set of any one of embodiment 44 and embodiment 45.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. An inkjet printer, comprising:
    color channels, with each comprising a respective color ink, six or fewer of the channels comprising selected process color inks from a known process ink color set, and
    two or more of the channels comprising spot color inks as corresponding substitutes for non-selected process color inks from the known process ink color set, wherein the spot color inks comprise higher stability pigments as compared to the non-selected process color inks;
    wherein the ratio of the number of channels comprising spot color inks to the number of channels comprising selected process color inks is greater than 1:1; and
    a driver configured to recognize each of the selected process colors and spot colors, and to substitute at least one of the spot colors for at least one of the non-selected process colors that is listed in a design file.

2. The printer of claim 1, wherein the printer comprises at least three color channels and three or fewer of the channels comprise selected process color inks.

3. The printer of claim 1, wherein the printer comprises at least six channels and wherein three or fewer of the channels comprise a selected process color ink and two or more of the channels comprise spot color inks.

4. The printer of claim 1, wherein the printer comprises six channels comprising spot color inks and two channels comprising selected process color inks.

5. The printer of claim 1, wherein the printer comprises at least four color channels.

6. The printer of claim 1, wherein spot colors comprise at least one of spot yellow and spot black.

7. The printer of claim 1, wherein the ratio of the number of channels comprising spot color inks to the number of channels comprising selected process color inks is at least 3:1.

8. The printer of claim 1, wherein the higher stability pigments have a ΔE of less than 5.0 when tested under Xenon weathering for 4000 hours.

9. A process for printing an image, comprising:
selecting six or fewer process colors from a known process ink color set;
providing two or more spot colors comprising corresponding substitutes for non-selected process colors from the known process ink color set, wherein the provided spot colors comprise higher stability pigments as compared to the non-selected process colors;
forming a color set comprising the selected process colors and the provided spot colors wherein the ratio of the number of provided spot colors to the number of selected process colors is greater than 1:1;
providing an inkjet printer comprising a driver, six or fewer process color channels, and two or more spot color channels, wherein each of the process color channels is associated with one of the selected process colors, and wherein each of the spot color channels is associated with one of the provided spot colors;
recognizing, via the driver, each of the selected process colors and the provided spot colors of the formed color set; and
printing, via the driver, at least one of the process color channels, and at least one of the spot color channels, an image on a substrate, wherein the printing includes substituting, using the driver, at least one of the provided spot colors for at least one of the non-selected process colors that is listed in a design file.

10. The process of claim 9, wherein the provided spot colors comprise an additional spot color wherein the additional spot color does not correspond to one of the non-selected members of the known process ink color set.

11. The process of claim 9, wherein the formed color set comprises at least four colors.

12. The process of claim 11, wherein three or fewer of the colors comprise selected process colors and two or more of the colors comprise provided spot colors.

13. The process of claim 9, wherein the printed image has a ΔE of less than 5.0 when tested under Xenon weathering for 4000 hours.

14. The process of claim 9, wherein the formed color set has a color gamut of at least 200,000 units, as measured using Colorthink Pro 3.0.

15. The process of claim 9, wherein the two or more provided spot colors comprise at least one of spot yellow and spot black.

16. The process of claim 9, wherein the formed color set comprises at least three colors, and wherein three or fewer of the colors comprise selected process colors.

17. The process of claim 9, wherein the formed color set comprises six provided spot colors and two selected process colors.

18. The process of claim 9, wherein the ratio of the number of provided spot colors to the number of selected process colors is at least 3:1.

19. The process of claim 9, wherein the higher stability pigments have a ΔE of less than 5.0 when tested under Xenon weathering for 4000 hours.

20. The process of claim 9, wherein the provided spot colors comprise higher concentrations of UV stabilizers as compared to the non-selected process colors.

* * * * *